(12) United States Patent
Wei et al.

(10) Patent No.: US 9,288,032 B2
(45) Date of Patent: Mar. 15, 2016

(54) DYNAMIC FRAME STRUCTURE FOR SYNCHRONOUS TIME-DIVISION DUPLEXING DIGITAL SUBSCRIBER LINES

(71) Applicant: Futurewei Technologies, Inc., Plano, TX (US)

(72) Inventors: Dong Wei, Austin, TX (US); Cao Shi, Shenzhen (CN); Xiaoyue He, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 216 days.

(21) Appl. No.: 13/862,126

(22) Filed: Apr. 12, 2013

(65) Prior Publication Data

US 2013/0272177 A1 Oct. 17, 2013

Related U.S. Application Data

(60) Provisional application No. 61/624,063, filed on Apr. 13, 2012.

(51) Int. Cl.
| | |
|---|---|
| *H04L 5/14* | (2006.01) |
| *H04B 3/32* | (2006.01) |
| *H04M 11/06* | (2006.01) |
| *H04L 27/26* | (2006.01) |

(52) U.S. Cl.
CPC .. *H04L 5/14* (2013.01); *H04B 3/32* (2013.01); *H04L 5/1469* (2013.01); *H04L 27/2602* (2013.01); *H04M 11/062* (2013.01)

(58) Field of Classification Search
CPC ........... H04J 11/00; H04L 27/28; H04L 27/26
See application file for complete search history.

(56) References Cited

U.S. PATENT DOCUMENTS

| | | |
|---|---|---|
| 5,680,394 A | 10/1997 | Bingham et al. |
| 6,480,475 B1 | 11/2002 | Modlin et al. |
| 2005/0259629 A1* | 11/2005 | Oliver et al. ................. 370/345 |

(Continued)

FOREIGN PATENT DOCUMENTS

| | | |
|---|---|---|
| CN | 102096649 A | 6/2011 |
| WO | 2005117287 A2 | 12/2005 |

OTHER PUBLICATIONS

Les, H, et al., "G.fast:Discontinuous Operation," ITU—Telecommunication Standardization Sector, Study Group 15, Temporary Document 11BM-035, Bedford, Massachusetts, Jun. 20-24, 2011, 2 pages.

(Continued)

*Primary Examiner* — Anez Ebrahim
(74) *Attorney, Agent, or Firm* — Conley Rose, P.C.; Grant Rodolph; William H. Dietrich

(57) ABSTRACT

An access node for digital subscriber line (DSL) communication comprising a transceiver configured to couple to a subscriber line, and a control entity coupled to the transceiver, wherein the control entity is configured to receive a request to switch to a nominal asymmetry ratio between an upstream data rate and a downstream data rate after initialization of the subscriber line, determine a flexible time period value based on the nominal asymmetry ratio, wherein the flexible time period is used to define a time division duplexing (TDD) frame structure, and forward a message that comprises the flexible time period value to the transceiver, wherein the transceiver is configured to transmit an upstream transmission using the TDD frame structure over the subscriber line, and receive a downstream transmission using the TDD frame structure over the subscriber line.

14 Claims, 12 Drawing Sheets

(56) References Cited

U.S. PATENT DOCUMENTS

2007/0263570 A1* 11/2007 Alapuranen et al. .......... 370/337
2008/0232286 A1* 9/2008 Habetha et al. ............... 370/311
2009/0245093 A1* 10/2009 Rangan et al. ................ 370/210
2011/0058468 A1* 3/2011 Singh et al. ................... 370/201
2011/0274056 A1* 11/2011 Sampath et al. .............. 370/329

OTHER PUBLICATIONS

Dong, W., et al., "G.fast: Discontinuous Mode Power Saving," ITU—Telecommunication Standardization Sector, Study Group 15, Temporary Document 2012-05-4A-030, Geneva, Switzerland, May 2012, 7 pages.

"Self-FEXT Cancellation (Vectoring) for use with VDSL2 transceivers," Series G: Transmission Systems and Media Digital Systems and Networks, ITU-T, G.933.5, ITU-T—Telecommunication Standardization Sector of ITU, Apr. 2010, 80 pages.

Foreign Communication From a Counterpart Application, PCT Application No. PCT/CN2013/074203, International Search Report dated Jul. 25, 2013, 6 pages.

Foreign Communication From a Counterpart Application, PCT Application No. PCT/CN2013/074203, Written Opinion dated Jul. 25, 2013, 5 pages.

\* cited by examiner

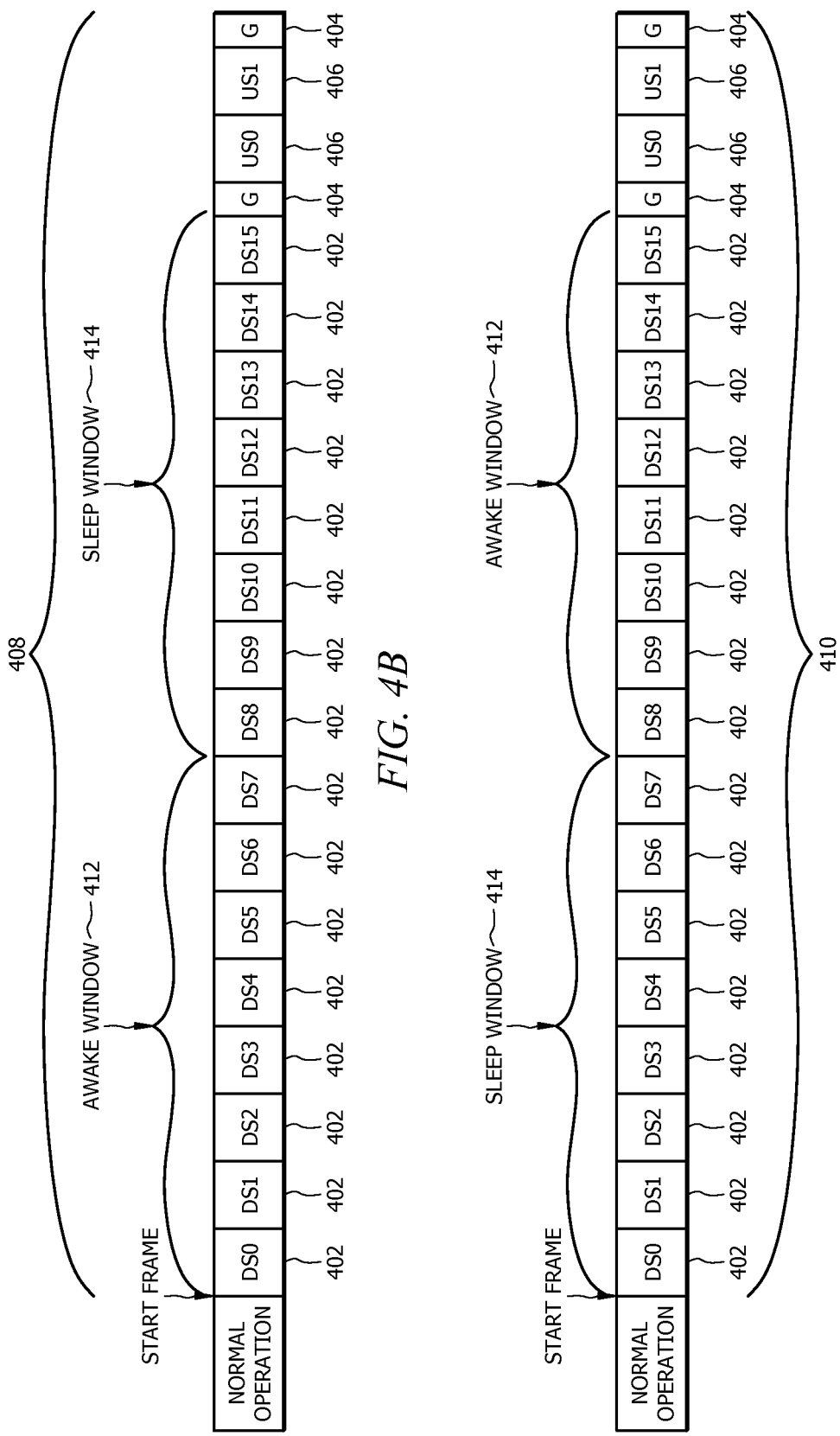

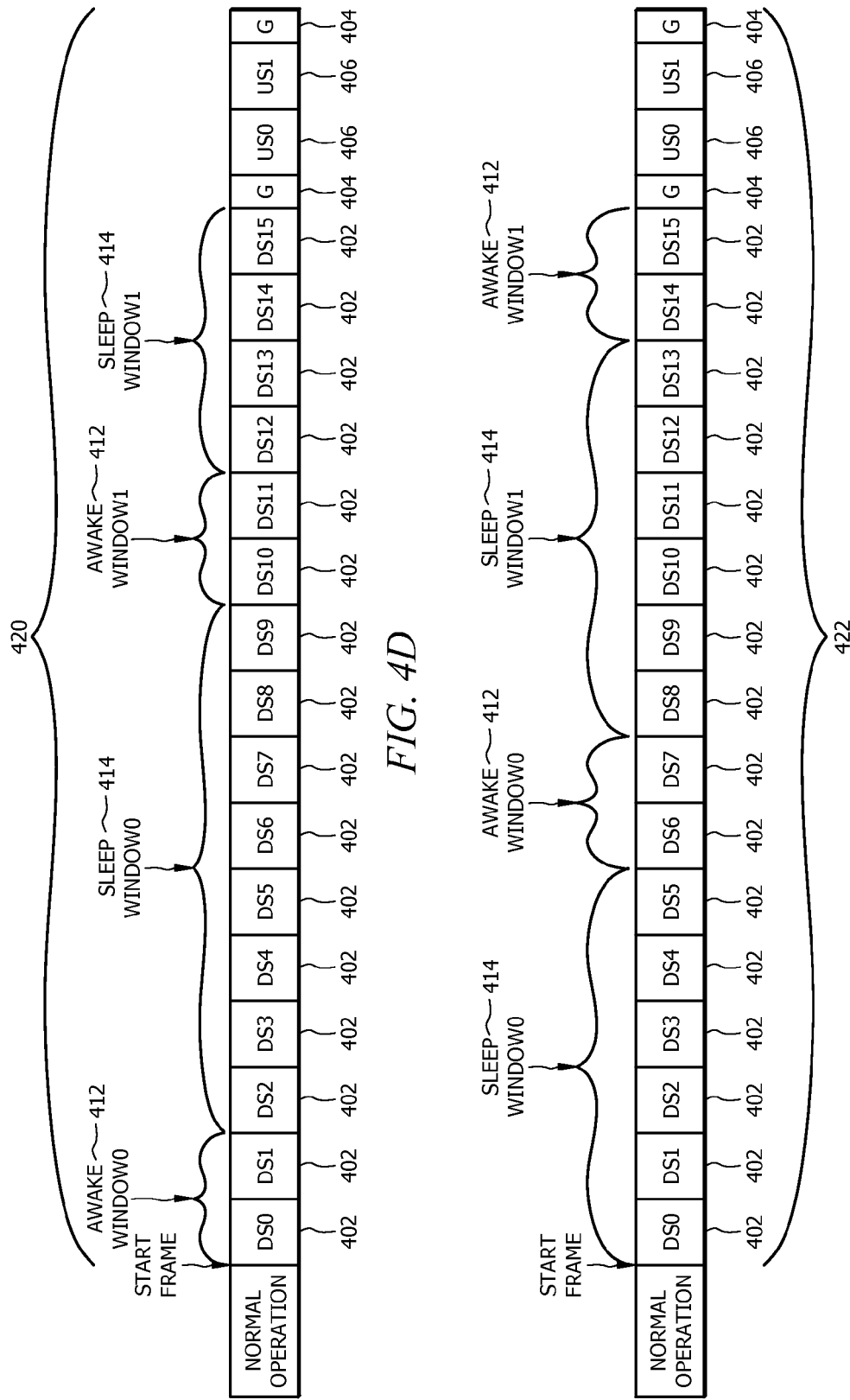

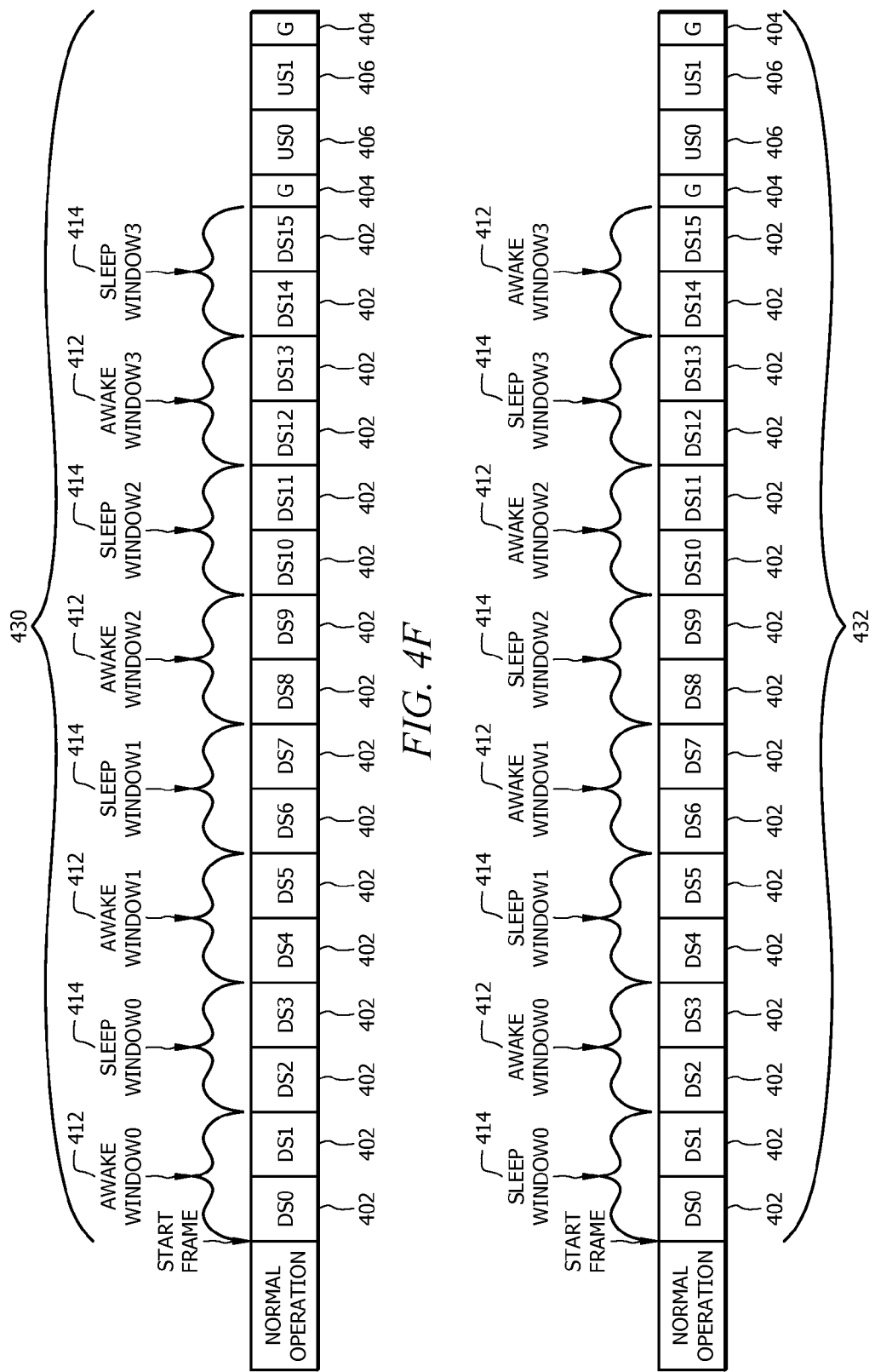

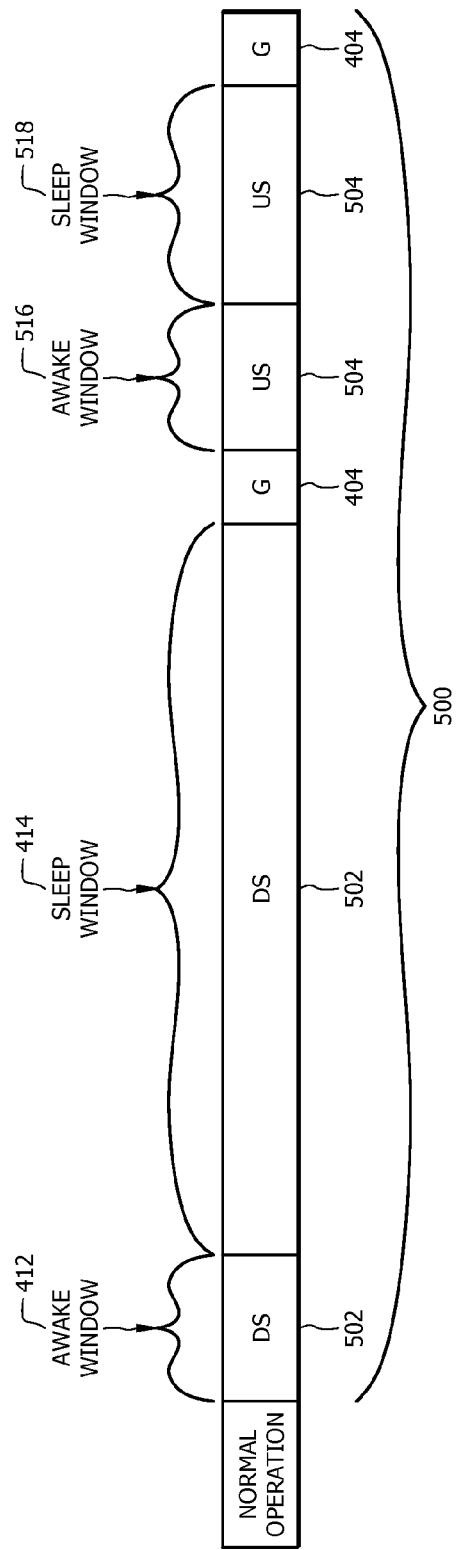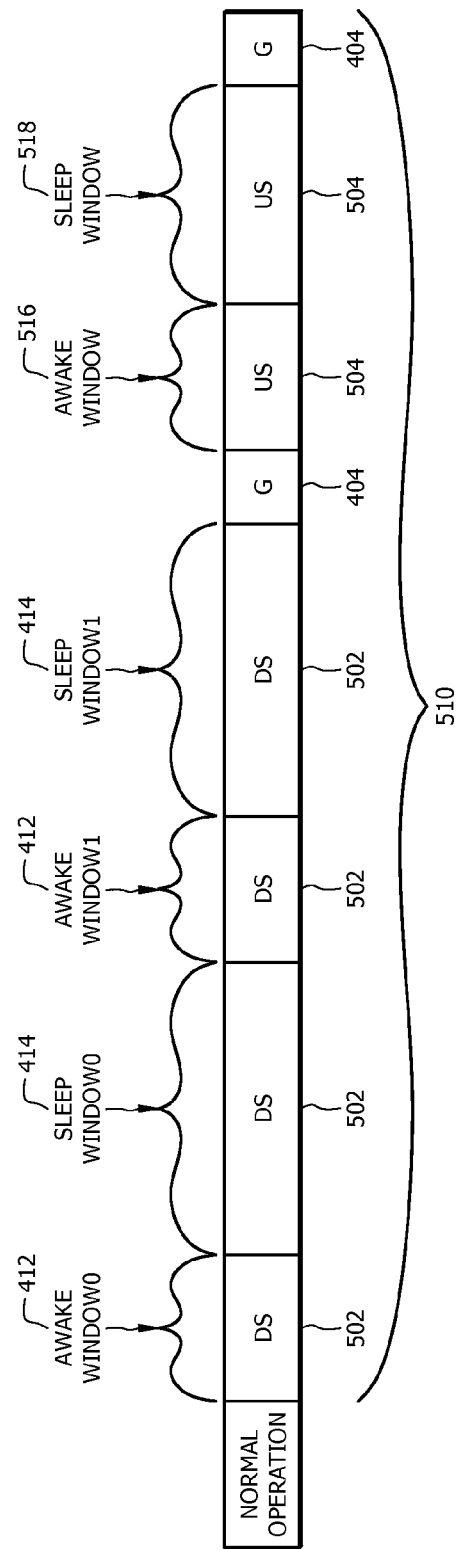

DYNAMIC FRAME STRUCTURE FOR SYNCHRONOUS TIME-DIVISION DUPLEXING DIGITAL SUBSCRIBER LINES

CROSS-REFERENCE TO RELATED APPLICATIONS

The present application claims priority to U.S. Provisional Patent Application No. 61/624,063 filed Apr. 13, 2012 by Dong Wei, et al. and entitled "Dynamic Frame Structure for Synchronous Time-Division Duplexing Digital Subscriber Lines," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern digital subscriber line (DSL) technologies, such as asymmetric digital subscriber lines (ADSL) and very high speed digital subscriber lines (VDSL), create communication systems that provide bi-directional, high-speed data transmissions over twisted-pair phone lines. In DSL communication systems, both downstream and upstream signals travel on the same pair of wires and are separated from each other using a duplexing method. Currently, many DSL communication systems are configured to implement frequency division duplexing (FDD) in order to separate the downstream signals from the upstream signals. For FDD based DSL communication systems, the upstream and downstream signals occupy different frequency bands and are separated by transceivers using filters. However, FDD based DSL communication systems may suffer drawbacks, such as longer loop lengths, susceptibility to noise (e.g. crosstalk) at higher frequencies, and inefficiencies when managing asymmetry transmissions. Therefore, as the demand for faster transmission rates and shorter loop lengths continue to increase, the telecommunication industry has been considering other transmission schemes to manage DSL communication.

One alternative is to utilize synchronous time division duplexing (TDD) to transmit and receive upstream and downstream signals within a DSL communication system. TDD synchronizes the upstream and downstream communication periods to prevent overlapping of the upstream and downstream signals. For example, a synchronous TDD based DSL communication system may transmit downstream data and upstream data in an alternating fashion. Either downstream data or upstream data is transmitted for a certain time period, but both are not transmitted during the same time period. The downstream data and upstream data may be separated by guard time periods, which signify periods when no data is transmitted in either direction. Synchronous TDD based DSL communication systems may be more efficient at managing asymmetric transmissions between the upstream and downstream transmissions. For instance, within a synchronous TDD based DSL communication system, as the amount of data increases for an upstream transmission, communication capacity may be reallocated from the downstream transmission to the upstream transmission. Additionally, when the data traffic for the upstream transmission decreases, the synchronous TDD DSL communication system may reallocate the communication capacity back to the downstream transmission.

Even though synchronous TDD based DSL communication systems may be more efficient at managing asymmetric transmissions compared to FDD DSL communication systems, the current TDD frame structure is inherently static and causes a fixed nominal asymmetry ratio between downstream and upstream data rates. In other words, current TDD based DSL communication systems may allocate communication capacities (e.g. data rates) for upstream transmission and downstream transmission during the initialization state, but not during the "showtime" state. For example, after a connection is established between a transmitter and receiver for a DSL line and the transmitter is ready to transmit data to the receiver, (e.g. "showtime state") the actual transmission of data within the DSL line may be lower than the allocated communication capacities. To compensate for the low data rate, the transmitter may add dummy bits or symbols to provide a constant transmission of data. The dummy bits or symbols may consume bandwidth within the DSL communication system without improving system performance. Furthermore, as bandwidth and data sampling rates continue to increase, the constant transmission of dummy bits or symbols may increase power consumption. Thus, a solution is needed to provide greater flexibility in managing DSL transmissions and reduces power consumption within synchronous TDD based DSL communication systems.

SUMMARY

In one embodiment, the disclosure includes an access node for DSL communication comprising a transceiver configured to couple to a subscriber line, and a control entity coupled to the transceiver, wherein the control entity is configured to receive a request to switch to a nominal asymmetry ratio between an upstream data rate and a downstream data rate after initialization of the subscriber line, determine a flexible time period value based on the nominal asymmetry ratio, wherein the flexible time period is used to define a TDD frame structure, and forward a message that comprises the flexible time period value to the transceiver, wherein the transceiver is configured to transmit an upstream transmission using the TDD frame structure over the subscriber line, and receive a downstream transmission using the TDD frame structure over the subscriber line.

In another embodiment, the disclosure includes an access node for DSL communication over a plurality of subscriber lines comprising a control entity, a transceiver coupled to the control entity, wherein the transceiver is configured to determine a number of active symbols to be transmitted within a TDD frame, and transmit a downstream transmission portion of the TDD frame via a first subscriber line using the number of active symbols to be transmitted, wherein the TDD frame comprises a plurality of symbols, wherein the number of active symbols to be transmitted is no more than a total number of symbols allocated for the downstream portion of the TDD frame, and wherein a downstream transmitter of the first subscriber line is powered off after the transmission of the active symbols during the downstream transmission portion of the TDD frame.

In yet another embodiment, the disclosure includes a method for DSL communication over a plurality of subscriber lines in the showtime state, wherein the method comprises receiving a message that sets a number of active symbols within a TDD frame, and transmitting an upstream transmission portion of the TDD frame over a first subscriber line, wherein the upstream transmission portion of the TDD frame comprises an awake window and a sleep window, wherein the length of the awake window and the sleep window are set by the number of active symbols, and wherein a transmitter of the first subscriber line powers off during the sleep window.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4B is a schematic diagram of another embodiment of TDD frame with one "awake" window and one "sleep" window.

FIG. 4C is a schematic diagram of another embodiment of TDD frame with one "awake" window and one "sleep" window.

FIG. 4D is a schematic diagram of another embodiment of TDD frame with two "awake" windows and two "sleep" windows.

FIG. 4E is a schematic diagram of another embodiment of TDD frame with two "awake" windows and two "sleep" windows.

FIG. 4F is a schematic diagram of another embodiment of TDD frame that interleaves "sleep" windows with "awake" windows.

FIG. 4G is a schematic diagram of another embodiment of TDD frame that interleaves "sleep" windows with "awake" windows.

FIG. 5A is a schematic diagram of another embodiment of TDD frame with a "sleep" window and an "awake" window located at the upstream transmission.

FIG. 5B is a schematic diagram of another embodiment of TDD frame with a "sleep" window and an "awake" window for the upstream transmission.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Disclosed herein are a method, an apparatus, and a system to dynamically assign a nominal asymmetry ratio based on a flexible TDD frame structure and to provide power saving with discontinuous operation. A synchronized TDD DSL communication system may use the flexible TDD frame structure to perform online reconfiguration according to a dynamic nominal asymmetry ratio between the downstream and upstream data rates for subscriber lines coupled to an access node (e.g. a digital subscriber line access multiplexer (DSLAM)) during the "showtime" state. A flexible time period within the dynamic TDD frame may be adjusted and allocated to the downstream transmission and/or the upstream transmission based on the nominal asymmetry ratio. When operating in a discontinuous mode, one or more subscriber lines (e.g. transmission paths) may be turned off during the transmission of TDD frames. A minimum number of active symbols may be computed to determine one or more "awake" windows and "sleep" windows. During the "sleep" windows, transmissions paths may be shut off to conserve power. The synchronized TDD based DSL communication system may implement vectoring and node management mechanisms to manage the effects of cross talk between subscriber lines.

Figure 1:
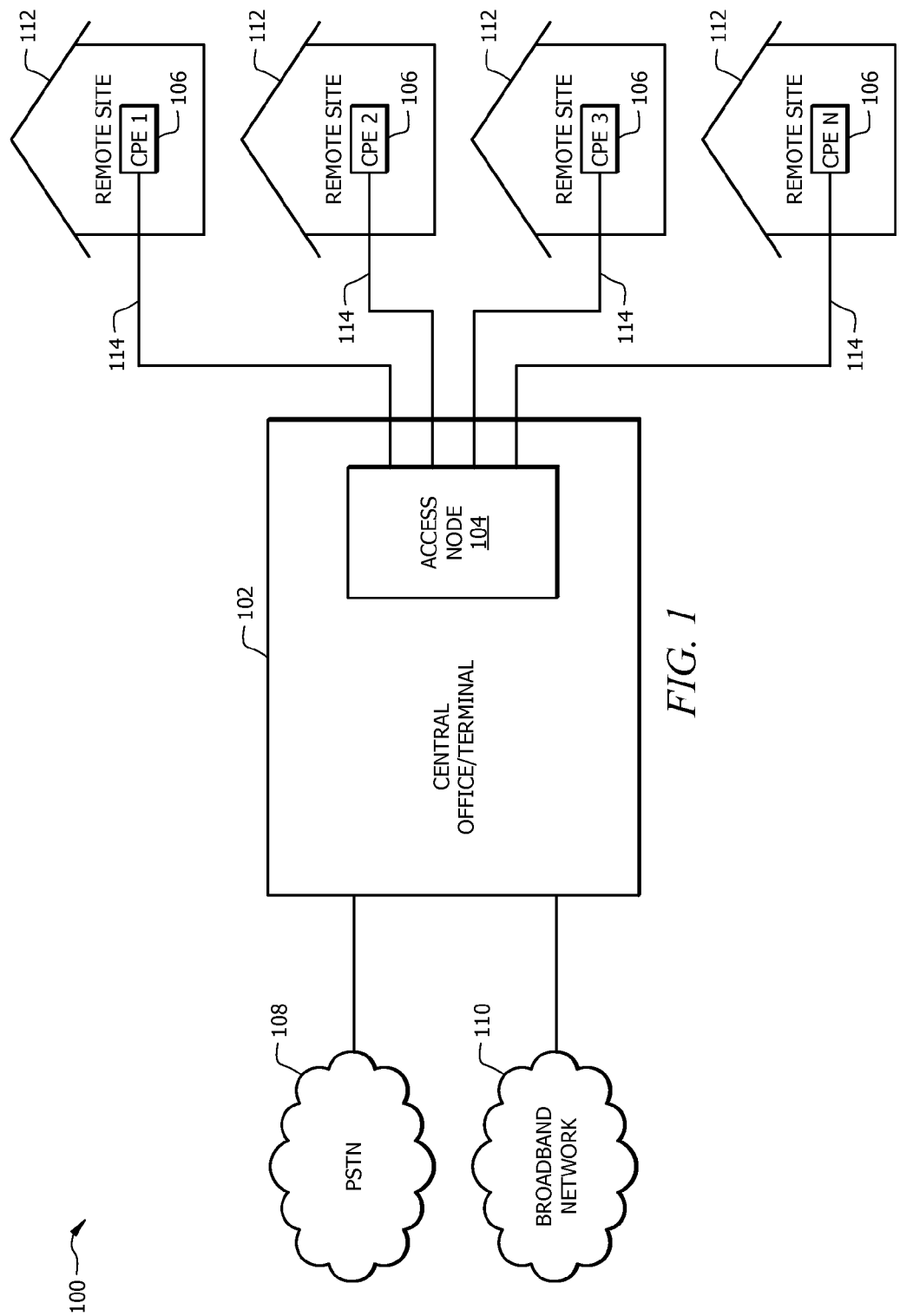
FIG. 1 is a schematic diagram of an embodiment of a synchronized TDD based DSL system.

FIG. 1 is a schematic diagram of an embodiment of a synchronized TDD based DSL system 100 where embodiments of the present disclosure may operate. The synchronized TDD based DSL system 100 may be an ADSL2 system, an ADSL2+ system, a VDSL2 system, or any other DSL system defined by the International Telecommunication Union Telecommunication Standardization Sector (ITU-T) G.hn or G.fast standards. The synchronized TDD based DSL system 100 may comprise a central office/terminal 102, a public switch telephone network (PSTN) 108, a broadband network 110, and a plurality of remote sites 112. One end of the central office/terminal 102 (e.g. northbound interface) may be coupled the PSTN 108 and broadband network 110, while the other end (e.g. southbound interface) may be coupled to the remote sites 112. The PSTN 108 may be a network that generates, processes, and receives voice or other voice-band signals. The PSTN 108 may comprise telephone lines, fiber optic cables, microwave transmission links, and other network devices necessary to provide telephone exchanges. The broadband network 110 may be any network that transports data, such as Internet Protocol (IP), Multiprotocol Label Switching (MPLS), and Ethernet networks. Broadband network 110 may be a network that operates in the electrical, optical, or a combination of both domains. The broadband network 110 may comprise one or more local area networks (LANs), virtual networks, wide area networks (WANs), and/or metropolitan area networks (MANs).

The central office/terminal 102 may be any device or combination of devices that originate DSL communication and services for the remote sites 112. In one embodiment, the central office/terminal 102 may be a central office of an Internet Service Provider (ISP) and/or a telephone service provider. In another embodiment, central office/terminal 102 may be a remote cabinet or other terminal located at a distribution center between the central office and remote site 112. The central office/terminal 102 may comprise an access node 104 that may be coupled to the remote sites 112 via a plurality of subscriber lines 114. The subscriber lines 114 may form transmissions paths between the access node 104 and remote sites 112. The subscriber lines 114 may be made of any suitable material such as copper wire and/or optical fiber and may be bundled together to form a binder. The access node 104 may be any network device that terminates access loop connections from the remote sites 112. In DSL communication systems, the access node 104 may be a DSLAM or a distribution point unit, while in a passive optical network (PON), the access node 104 may be an optical network termination (ONT) and/or an optical network unit (ONU), where the access node 104 is located between the optical line terminal (OLT) (e.g. not shown in FIG. 1) and remote sites 112. The remote sites 112 may be customer premises, such as residences, businesses, and/or other end users that receive DSL services. Each remote site 112 may comprise customer premise equipment (CPE) 106, which may include, but not limited to a DSL modem and an internet gateway. CPE 106 may provide DSL communication and services to a variety of devices within the customer premise, such as phones, computers, televisions, and other IP-based devices. The access node 104 is located on the operator side while the remote sites 112 are located on the customer premise side of the synchronized TDD based DSL system 100.

Figure 2:
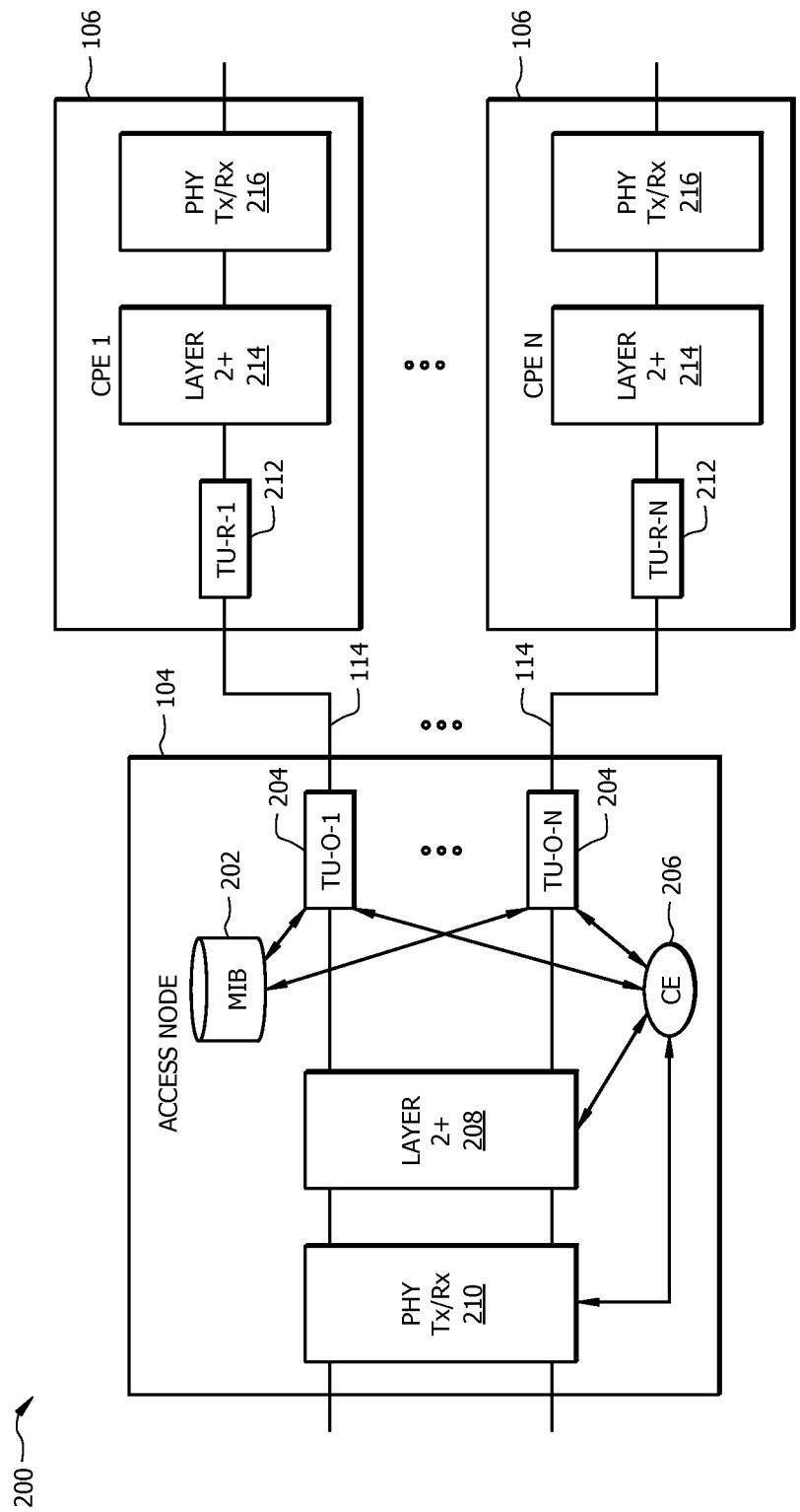
FIG. 2 is a schematic diagram of another embodiment of a synchronized TDD based DSL system.

FIG. 2 is a schematic diagram of another embodiment of a synchronized TDD based DSL system 200 where embodiments of the present disclosure may operate. Similar to FIG. 1, the synchronized TDD based DSL system 200 may comprise an access node 104 and a plurality of CPEs 1-N 106. The access node 104 may comprise a physical (PHY) transmitting (Tx)/receiving (Rx) interface 210, a layer 2+ module 208, a control entity (CE) 206, a management information base (MIB) 202, and one or more transceiver units located on the operator side (TU-Os) 1-N 204. Each of the CPEs 1-N 106 may comprise a transceiver unit located on the remote site (TU-R) 212, a layer 2+ module 214, and a PHY Tx/Rx interface 216. The PHY Tx/Rx interfaces 210 and 216 may comprise a plurality of ports and a plurality of transceivers that transmit and/or receive data signals in the electrical domain and/or in the optical domain. The layer 2+ modules 208 and 214 may be components configured to process incoming data abstracted at Open Systems Interconnection (OSI) layer 2 or higher. The CE 206 may be one or more network components that perform control functions and convey the operational status of the access node, such as identifying which subscriber line 114 to route the data to and obtaining the current traffic load for each subscriber line 114. The MIB 202 may be one or more network components that provide network support information for resource utilization and map the components within the access node. For example, the MIB 202 may be configured to provide the nominal asymmetry ratio for the downstream transmission and the upstream transmission as a MIB configuration parameter. In one embodiment, the MIB 202 may be an MIB as described in the Internet Engineering Task Force (IETF) Request for Comments (RFC) 1213, published March 1991, which is incorporated herein as if reproduced in its entirety.

The access node 104 may receive data on the PHY Tx/Rx interface 210 and forward the incoming data to the layer 2+ module 208 for processing. Afterwards, the layer 2+ module 208 may transmit the data to TU-Os 1-N 204, which transmits the data to the corresponding CPEs 1-N 106 as a downstream transmission. For example, the access node 204 may transmit one set of data to CPE 1 106 via TU-O-1 204 and another set of data to CPE N 106 via TU-O-N 204. The TU-Rs 1-N 212 within each CPE 106 may receive the data from the downstream transmission and forward the data to the PHY Tx/Rx interface 216 via the layer 2+ module 214. As discussed above, the PHY Tx/Rx interface 216 and layer 2+ module 214 may be substantially similar as the PHY Tx/Rx interface 210 and the layer 2+ module 208. After the TU-Rs 1-N 212 receives the data from the downstream transmission, the TU-Rs 1-N 212 may respond back by transmitting data to the TU-O 1-N 204 as an upstream transmission. For convenience purposes, data that is transmitted from the TU-Os 1-N 204 to the TU-Rs 1-N 212 will be referenced as a downstream transmission, while data received at the TU-Os 1-N 204 and transmitted from the TU-Rs 1-N 212 will be referenced as an upstream transmission throughout this disclosure.

In FIG. 2, the CE 206 and MIB 202 may communicate with the TU-Os 1-N 204 to dynamically modify the structure of a TDD frame during a "showtime" state. The "showtime" state may be the subsequent state after initializing a subscriber line 114 for one or more CPEs 106. During the "showtime" state, a TU-O 204 and corresponding TU-R 212 may be ready to transmit and receive data over a subscriber line 114. When an operator or network administrator requests to reconfigure the nominal asymmetry ratio for subscriber lines 114 during the "showtime" state, the CE 206 may coordinate the reconfiguration of the TDD frame. In one embodiment, the operator and network administrator may provide a new nominal asymmetry ratio as a MIB configuration parameter. After the CE 206 receives a request to switch to the new nominal asymmetry ratio, the CE 206 may use the new nominal asymmetry ratio to determine values for configuration parameters for the TDD frame, such as the downstream flexible time period and the upstream flexible time period. In one embodiment, CE 206 may obtain the new nominal asymmetry ratio from the MIB 202. Table 1 provides a list of the definitions of parameters used within the access node 104 (e.g. CE 206) to dynamically configure the TDD frame in the "showtime" state:

TABLE 1

| | |
|---|---|
| $T_{fixed-DS}$ | Fixed time period for downstream transmission |
| $T_{fixed-US}$ | Fixed time period for upstream transmission |
| $T_{flex}$ | flexible time period |
| | $T_{flex} = T_{flex-DS} + T_{guard-DS} + T_{flex-US}$ |
| $T_{flex-DS}$ | The portion of flexible time period used for downstream transmission |
| $T_{flex-US}$ | The portion of flexible time period used for upstream transmission |
| $T_{guard-DS}$ | Guard time following downstream transmission |
| $T_{guard-US}$ | Guard time following upstream transmission |

The configuration parameters for a TDD frame will be discussed in more detail in FIGS. 3A-3D.

The CE 206 may then send an online reconfiguration message that comprises the information for the new TDD frame structure (e.g. flexible time periods for upstream and downstream transmission) to TU-Os 1-N 204. The TU-Os 1-N 204 may then transmit the online reconfiguration message to the TU-Rs 1-N 212. The online reconfiguration message for the new TDD frame structure may be transmitted multiple times within a TDD frame and/or in a robust manner, such as within a logical connection that is protected against noise and other signal impairments. In one embodiment, all subscriber lines 114 at the access node 104 may be switched to the same new TDD frame structure to avoid near end crosstalk (NEXT) interference between the subscriber lines 114. After the switch to the new nominal asymmetry ratio, the values of the parameters, such as $T_{fixed-DS}$, $T_{fixed-US}$, $T_{flex}$, $T_{guard-US}$, and $T_{guard-DS}$ may remain the same for the TDD frame until the operator or network administrator requests for a new nominal asymmetry ratio. The TDD frame structure and nominal asymmetry ratio will be discussed in more detail below.

Figure 3A:
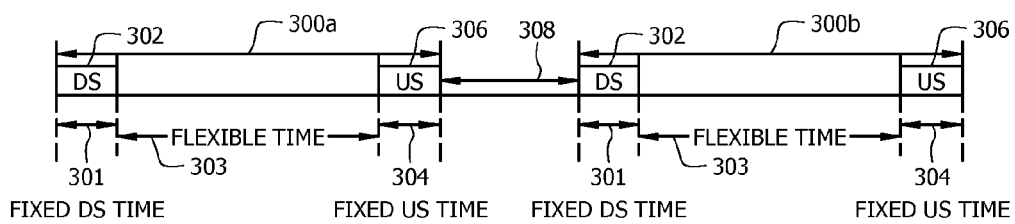
FIG. 3A is a schematic diagram of an embodiment of the frame structure for TDD frames.

FIG. 3A is a schematic diagram of an embodiment of the frame structure for TDD frames 300a and 300b. Each of the TDD frames 300a and 300b may comprise a fixed downstream time period 301 (e.g. $T_{fixed-DS}$), a flexible time period 303 (e.g. $T_{flex}$), a fixed upstream time period 304 (e.g. $T_{fixed-US}$), and upstream guard time period 308 (e.g. $T_{guard-US}$). In one embodiment, each of the TDD frames 300a and 300b may have a total time period of about one millisecond. The fixed downstream time period 301, flexible time period 303, and fixed upstream time period 304 may each comprise one or more symbols. For example, the TDD frames 300a and 300b may have a length of about 20 symbols. The fixed downstream time period 301 may be allocated five symbols, the flexible time period 303 may be allocated 15 symbols, and the fixed upstream time period 304 may be allocated five symbols. Each of the symbols may be associated with a modulation symbol. Using FIG. 2 as an example, if the synchronized TDD based DSL system 200 is configured to implement Discrete Multi-Tone modulation (DMT), then each symbol within a TDD frame 300 may be associated with a DMT symbol. In other embodiments, the symbol may be associated with other types of quadrature amplitude modulation (QAM) symbols, such as orthogonal frequency division multiplexing (OFDM) symbols. The total length of a TDD frame in units of the number of symbols (e.g. $T_{total}$) may be given by equation 1:

$$T_{total}=T_{fixed-DS}+T_{flex}+T_{fixed-US}+T_{guard-US} \quad (1)$$

In one embodiment, the values of $T_{total}$, $T_{fixed-DS}$, $T_{flex}$, $T_{fixed-US}$, and $T_{guard-US}$ may be represented by the number of symbols allocated for each time period. For example, $T_{total}$ may have a total length of 20 symbols. Persons of ordinary skill in the art are aware the number of bits for each symbol may vary depending on the type of symbol. For example, in one embodiment, a symbol may be represented using eight bits.

The fixed downstream time period 301 (e.g. $T_{fixed-DS}$) may be assigned to downstream transmissions, and the fixed upstream time period 304 (e.g. $T_{fixed-US}$) may be assigned to upstream transmissions. The fixed downstream time period 301 may represent the minimum time period allocated for a downstream transmission 302, while the fixed upstream time period 304 may represent the minimum time period allocated for an upstream transmission 306. The fixed downstream time period 301 and the fixed upstream time period 304 may be derived from the minimum data rate for the subscriber lines managed by an access node. An operator or network administrator may determine the minimum data rate for subscriber lines based on a variety of factors, such as customer requirements, network performance, and/or other service requirements. The fixed downstream time period 301 and the fixed upstream time period 304 may be used to perform channel tracking functions for channels within a subscriber line, such as determining signal-to-noise ratio (SNR) measurements, tracking the number of errors received on a channel, and tracking crosstalk-coupling noise for channels on other subscriber lines. In one embodiment, the fixed upstream time period 304 may be used by a CE for updating pre-coders and the fixed downstream time period 301 may be used by a CE for updating cancellers located within the TU-O when implementing vectoring mechanisms. The CE may send one or more pre-coder coefficients and canceller coefficients to each TU-O.

Using FIG. 2 as an example, an operator or network administrator may set the fixed downstream time period 301 and the fixed upstream time period 304 for subscriber lines 114 that couple CPE 1-N 106 to access node 104. In one embodiment, the operator or network administrator may set the same fixed downstream time period 301 and the same fixed upstream time period 304 for all subscriber lines 114 when transmitting the TDD frames 300a and 300b. An operator or network administrator may not adjust the nominal asymmetry ratio such that the allocated downstream transmission 302 and allocated upstream transmission 306 fall below the fixed downstream time period 301 and fixed upstream time period 304. As shown in FIG. 3A, the allocated downstream transmission 302 and the allocated upstream transmission 306 are about the fixed downstream time period 301 and the fixed upstream time period 304, respectively.

FIG. 3A illustrates that an upstream guard time period 308 (e.g. $T_{guard-US}$) may typically separate TDD frames 300a and 300b. Upstream guard time period 308 may be located between the TDD frames 300a and 300b and may follow the allocated upstream transmission 306 of the TDD frame 300a. The upstream guard time period 308 may provide a synchronized TDD based DSL system additional time for a transceiver to finish receiving the transmission of data before transmission starts in the opposite direction. For example, in FIG. 2, TU-R-1 212 may be transmitting data in an upstream transmission to TU-O-1 204. Immediately after TU-R-1 212 transmits the last data symbol, the last data symbol is still traveling over subscriber line 114 to reach TU-O-1 204. The upstream guard time period 308 may provide the additional time for the last data symbol to travel over subscriber line 114 to reach TU-O-1 204 before TU-O-1 204 starts transmitting data in a downstream transmission.

As shown in FIG. 3A, the flexible time period 303 (e.g. $T_{flex}$) may be the time period located between the fixed downstream time period 301 and the fixed upstream time period 304. In one embodiment, the length of the flexible time period 303 may be the sum of the flexible time period allocated for downstream transmission 302 (e.g. $T_{flex-DS}$), the flexible time period allocated for upstream transmission 306 (e.g. $T_{flex-US}$), and the downstream guard time period (e.g. $T_{guard-DS}$). The downstream guard time period may be located between the allocated downstream transmission 302 and the allocated upstream transmission 306 of a TDD frame 300 and may follow the allocated downstream transmission 302. The flexible time period may be represented based on equation 2 as shown below:

$$T_{flex}=T_{flex-DS}+T_{guard-DS}+T_{flex-US} \quad (2)$$

Similar to equation 1, $T_{flex}$, $T_{flex-DS}$, $T_{guard-DS}$, and $T_{flex-US}$ may have lengths represented by the number of symbols. The flexible time period 303 may be allocated to the downstream transmission, the upstream transmission, and/or as a downstream guard time period based on the nominal asymmetry ratio, the fixed downstream time period 301, and the fixed upstream time period 304. In FIG. 3A, the flexible time period 303 has been allocated to the downstream guard time period.

Figure 3B:
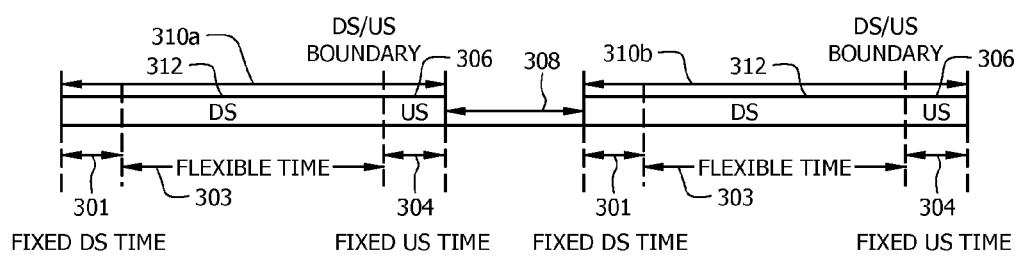
FIG. 3B is a schematic diagram of another embodiment of the frame structure for TDD frames.

FIG. 3B is a schematic diagram of another embodiment of the frame structure for TDD frames 310a and 310b. In contrast to FIG. 3A, FIG. 3B illustrates that all of the flexible time period 303 (e.g. 100%) has been allocated to the downstream transmission 312. Similar to FIG. 3A, the allocated upstream transmission 306 remains about the length of the fixed upstream time period 304. In another embodiment, the majority of the flexible time period 303 (e.g. more than 50%) may be allocated to the downstream transmission 312 followed by a downstream guard time period.

Figure 3C:
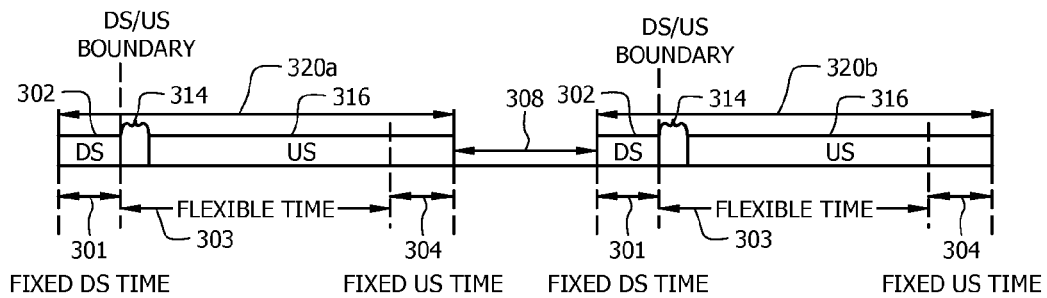
FIG. 3C is a schematic diagram of another embodiment of the frame structure for TDD frames.

FIG. 3C is a schematic diagram of another embodiment of the frame structure for TDD frames 320a and 320b. In contrast to FIG. 3B, FIG. 3C illustrates that the majority of the flexible time period 303 (e.g. more than 50%) has been allocated to the upstream transmission 316. A downstream guard time period 314 may be located between the allocated downstream transmission 302 and the allocated upstream transmission 316. Similar to FIG. 3A, the allocated downstream transmission 302 remains about the length of the fixed downstream time period 301. In another embodiment, all of the flexible time period 303 (e.g. 100%) may be allocated to the upstream transmission 316 when the TDD frames 320a and 320b are configured to not use a downstream guard time period 314.

Figure 3D:
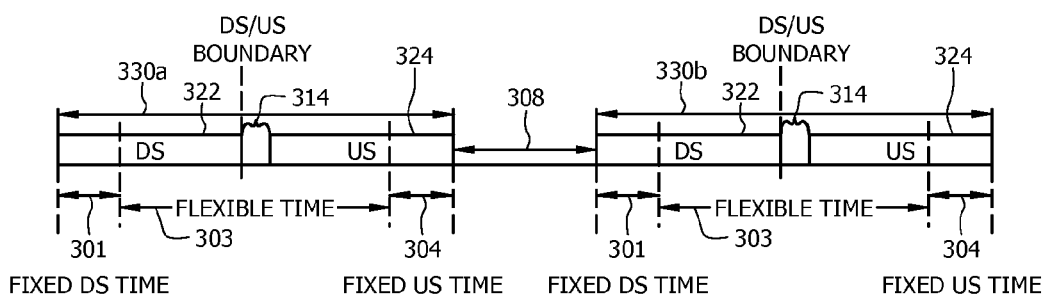
FIG. 3D is a schematic diagram of another embodiment of the frame structure for TDD frames.

FIG. 3D is a schematic diagram of another embodiment of the frame structure for TDD frames 330a and 330b. As shown in FIG. 3D, some of the flexible time period 303 may be allocated to the downstream transmission 322, while some of the flexible time period 303 may be allocated to the upstream transmission 324. A downstream guard time period 314 may separate the downstream transmission 322 and the upstream transmission 324. FIG. 3D illustrates that the total length based on the number of symbols for TDD frames 330a and 330b may be given as equation 3:

$$T_{total} = T_{fixed-DS} + T_{flex-DS} + T_{guard-DS} + T_{flex-US} + T_{fixed-US} + T_{guard-US} \quad (3)$$

Equation 3 may be derived from equation 1 by substituting $T_{flex}$ with $T_{flex-DS} + T_{guard-DS} + T_{flex-US}$. In one embodiment, the actual amount of data transmitted within a downstream transmission and/or an upstream transmission may be less than or equal to the allocated capacity for the downstream transmission 322 (e.g. $T_{fixed-DS} + T_{flex-DS}$) and/or the upstream transmission 324 (e.g. $T_{flex-US} + T_{fixed-US}$). For example, the downstream transmission 322 may be allocated about 15 symbols. However, the actual downstream transmission over a subscriber line may be about 12 symbols.

The nominal asymmetry ratio may determine the boundaries for the downstream transmission 322 and the upstream transmission 324 for a subscriber line. In other words, the nominal asymmetry ratio may set the maximum time period and/or number of symbols allocated for downstream transmission 322 and upstream transmission 324. For example, TDD frames 330a may have a maximum length of about 20 symbols, where the downstream transmission 322 is allocated about 15 symbols and the upstream transmission 324 is allocated about five symbols. Hence, in a downstream transmission 322, the actual number of symbols transmitted may be about 15 or less symbols, while the actual number of symbols transmitted in an upstream transmission 324 may be about five or less symbols. Allocation of the downstream transmission 322 and the upstream transmission 324 within the flexible time period 303 may be calculated from the nominal asymmetry ratio, the fixed downstream time period 301 (e.g. $T_{fixed-DS}$), and the fixed upstream time period 304 (e.g. $T_{fixed-US}$). More specifically, the relationship may be illustrated in equation 4, where the length of the different time periods may be based on the number of symbols:

$$\text{Nominal asymmetry ratio} = (T_{fixed-DS} + T_{flex-DS}) / (T_{fixed-US} + T_{flex-US}) \quad (4)$$

The nominal asymmetry ratio may be bounded by equation 5 to meet the minimum data rates for the downstream and upstream transmissions that was discussed in FIG. 3A:

$$\frac{T_{fixed-DS}}{T_{fixed-US} + T_{flex} - T_{guard-DS}} \leq \quad (5)$$

$$\text{asymmetry ratio} \leq \frac{T_{fixed-DS} + T_{flex} - T_{gaurd-DS}}{T_{fixed-US}}$$

In one embodiment, all subscriber lines managed by an access node may be configured with the same nominal asymmetry ratio. As discussed earlier, an operator or network administrator may provide the values for the nominal asymmetry ratio, fixed downstream time period 301, and the fixed upstream time period 304. A CE, such as the one shown in FIG. 2 (e.g. CE 206), may determine the values of $T_{flex-DS}$ and $T_{flex-US}$ using equations 4 and 5.

Figure 4A:
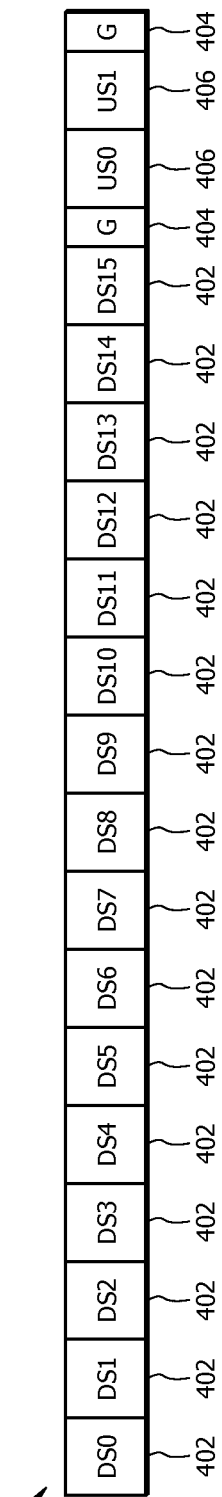
FIG. 4A is a schematic diagram of an embodiment of a TDD frame.

FIG. 4A is a schematic diagram of an embodiment of a TDD frame 400. The TDD frame 400 may comprise a plurality of downstream symbol slots (DS) 402, a plurality of upstream symbol slots (US) 406, and one or more guard slots 404. FIG. 4A illustrates that the downstream transmission may be allocated about 16 different DS0-15 402 and the upstream transmission may be allocated about two different US0-1 406. One of the guard slots 404 may follow the downstream transmission (e.g. after DS15 402), while the other guard slot 404 may follow the upstream transmission (e.g. after US1 406).

As discussed above, after the operator or network administrator requests to reconfigure the nominal asymmetry ratio, the flexible time periods for downstream transmission and upstream transmission may become static until the operator or network administrator submits another request. The actual downstream transmission and upstream transmission may consume less capacity than the capacity of the subscriber line (e.g. the allocated downstream transmission length and the allocated upstream transmission based off the nominal asymmetry ratio). For example, although the TDD frame 400 has about 16 DS 402 allocated for downstream transmission, the actual downstream transmission rate for a subscriber line may currently use about five DS 402. To reduce power consumption a synchronized TDD DSL system may operate in discontinuous operation. Discontinuous operation may turn off power for the entire subscriber line during some of the DS 402 and/or US 406 within the TDD frame 400.

FIG. 4B is a schematic diagram of another embodiment of TDD frame 408 with one "awake" window 412 and one "sleep" window 414. During the "awake" window 412, data traffic may be transmitted along the corresponding subscriber line, while during the "sleep" window 414, a transmitter of the subscriber line may be powered off. No data is transmitted during "sleep" window 414. In FIG. 4B, TDD frame 408 may allocate DS 0-7 to the "awake" window 412 and DS 8-15 to the "sleep" window 414. FIG. 4C illustrates a TDD frame 410 similar to TDD frame 408 except that the locations of the "awake" window 412 and "sleep" window 414 are reversed. Specifically, TDD frame 410 may allocate DS 0-7 to the "sleep" window 412 and DS 8-15 to the "awake" window 412. In some instances, a transceiver at the remote side (e.g. TU-R-1) may lose synchronization with the transceiver at the office side (e.g. TU-O-1) when the length of the sleep window is too long.

FIG. 4D is a schematic diagram of another embodiment of TDD frame 420 with two "awake" windows 412 and two "sleep" windows 414. As shown in FIG. 4D, DS0-1 may be allocated to "awake" window 0 412 and DS10-11 may be allocated to "awake" window 1 412 for TDD frame 420. TDD frame 402 may also have "sleep" window 0 414 that comprises DS2-9 402, while "sleep" window 1 414 comprises DS12-15 402. FIG. 4E illustrates that TDD frame 422 may be similar to TDD frame 420 except that location of the "sleep" windows 414 and "awake" windows 412 are reversed. As shown in FIG. 4E, awake window 0 412 is assigned to DS6-7, while "sleep" window 0 414 is assigned to DS0-5 402 for TDD frame 422. The use of two "awake" windows 412 and two "sleep" windows 414 may improve channel tracking and the synchronization problem encountered when using one "awake" window 412 and one "sleep" window 414. TDD frames 408, 410, 420, and 422 may be used for lower latency periods (e.g. less than one millisecond).

FIG. 4F is a schematic diagram of another embodiment of TDD frame 430 that interleaves "sleep" windows 414 with "awake" windows 412. The start of the TDD frame 430 may be an "awake" window 412 (e.g. "awake" window 412). The "sleep" windows 414 may be interleaved between the "awake" windows 412 to further diminish the synchronization loss between a transceiver at the remote side (e.g. TU-R-1) and corresponding transceiver at the office side (e.g. TU-O-1). In contrast to the TDD frame 430, the TDD frame 432 shown in FIG. 4G may start with a "sleep" window 414 (e.g. "sleep" window 0 414). As shown in FIGS. 4F and 4G, each of the "awake" windows 0-3 412 and "sleep" windows 0-3 414 may include two DS 402. In one embodiment, a sleep window index may be transmitted within a TDD frame that indicates the number of sleep windows within a downstream transmission. When a sleep window index is transmitted to the customer premise equipment, any of the symbols (e.g. DMT symbol) may be chosen to belong to "sleep" windows 414. Persons of ordinary skill in the art aware that a different number of DS 402 may be allocated for the "sleep" window 414 and/or "awake" window 412 than what are shown in FIGS. 4B-4G.

FIG. 5A is a schematic diagram of another embodiment of TDD frame 500 with a "sleep" window 518 with "awake" window 516 located at the upstream transmission 504. "Awake" window 516 and "sleep" window 518 may be substantially similar to "awake" window 412 and "sleep" window 414. Downstream transmission 502 and upstream transmission 504 may comprise one or more symbols. Some of the downstream transmission 502 and upstream transmission 504 may be transmitted within the "awake" windows 412 and 516, respectively. Other sections of the downstream transmission 502 and upstream transmission 504 may be transmitted within the "sleep" windows 414 and 518, respectively. FIG. 5B is a schematic diagram of another embodiment of TDD frame 510 with a "sleep" window 518 and an "awake" window 516 for the upstream transmission 504. In contrast to FIG. 5A, the number of "awake" windows 412 and "sleep" windows 414 for the downstream transmission 502 differ from the number of "awake" windows 516 and "sleep" windows 518 for the upstream transmission 504. FIG. 5B depicts that the downstream transmission 502 has more than one "awake" window 0-1 412 and "sleep" window 0-1 414, while the upstream transmission 504 may have one "awake" window 516 and one "sleep" window 518. Other embodiments of TDD frame 510 may differ the number awake" windows 412 and 516, and "sleep" windows 414 and 518 as shown in FIG. 5B.

As discussed above, during "showtime," when the user data traffic is lower than its allocated downstream capacity and upstream capacity for a subscriber line, discontinuous operation may reduce the number of transmitted symbols within a TDD frame. Discontinuous operation may turn off the entire transmission and reception path for some of the symbols to save power in the transceiver (e.g. the analog front-end (AFE), digital front-end (DFE), and the line driver).

When user traffic for a subscriber line increases, the number of transmitted symbols within a TDD frame may be increased until all the allocated DS and/or US within a TDD frame are used for transmission of user traffic. In particular, the number of active symbols within a TDD frame can be configured to be proportional to the volume of user traffic. For a given traffic volume in bits per second, the minimum number of active symbols in a TDD frame may be given by equation 6:

$$\text{number of active symbols} = \left\lceil \frac{\text{traffic volume} \times \frac{T_{total}}{\text{symbol rate}}}{\text{number of bits per symbol}} \right\rceil \quad (6)$$

The traffic volume may represent the traffic volume for a downstream transmission and/or an upstream transmission. When the traffic volume represents the traffic volume for a downstream transmission, the number of active symbols references the downstream transmission. Alternatively, when the traffic represents the traffic volume for the upstream transmission, the number of active symbols references the upstream transmission. The symbol rate may indicate the number of symbols transmitted per second and $T_{total}$ may indicate the total length of the TDD frame based on the number symbols. The number of bits per symbol may indicate the number of bits used to represent a symbol. The minimum number of active symbols may then be used to calculate the number of DS and/or US allocated to an "awake" window. In one embodiment, the minimum number of active symbols may be equally divided amongst the number of "awake" windows. Using FIG. 4D as an example, when the minimum number of active symbols has a value of eight, "awake" window 0-1 412 may each comprise four DS 402. Persons of ordinary in the skill in the art are aware that more active symbols than the minimum number of active symbols may be allocated for each "awake" window 412.

Using FIG. 2 as an example, the calculation of the minimum number of active symbol using equation 6 and the determination of number of active symbols transmitted may be performed within the CE 206 and/or within any of the transceivers TU-Os 1-N 204 and/or TU-Rs 1-N 212 during the "showtime" state. For example, TU-O-1 204 may calculate the minimum number of active symbol using equation 6 for the downstream transmission, while the TU-R-1 212 may calculate minimum number of active symbol using equation 6 for the upstream transmission. The MIB 202 may be configured to provide the parameters used in equation 6, such as the $T_{total}$ and number of bits per symbol. After calculating the minimum number of active symbol and determining the number of active symbols, an online reconfiguration message for changing the number of transmitted active symbols within a TDD frame is transmitted from a TU-O 204 to the corresponding TU-R 212 over a subscriber line 114. In one embodiment, the online reconfiguration message may be transmitted during a sync symbol. The online reconfiguration message may comprise the information of the new set of active symbols within a TDD frame. The information may provide mapping information for which active symbol slots (e.g. DS0) corresponds to "awake" windows and "sleep" windows. After receiving the message, the TU-R 212 may send an acknowledgement message to the TU-O 204. At that point, both the TU-O 204 and the TU-R 212 may simultaneously switch to the new set of active symbol slots starting from a pre-defined TDD frame.

The online reconfiguration of the number of active symbol slots within a TDD frame may be performed by a pair of transceivers for a per-subscriber line basis to adapt to the user traffic. The online reconfiguration may be performed in the downstream direction only, in the upstream direction only, or in both directions. In one embodiment, the online reconfiguration of the number of active symbol slots does not change the nominal asymmetry ratio between the downstream transmission and the upstream transmission for a subscriber line. Moreover, online reconfiguration of the number of active symbol slots does not modify the configuration of the symbols themselves (e.g., the number of bits per symbol). In one embodiment, each subscriber line may have different "awake" window lengths.

The turning off of certain symbol slots (e.g. DS0) within a TDD frame for a subscriber line may create non-stationary crosstalk for other subscriber lines connected to the same access node. For example, in FIG. 2, when symbol slots on the subscriber line 114 that couples TU-O-1 204 with TU-R-1 212 are turned off, non-stationary crosstalk may affect the subscriber line 114 that couples TU-O-N 204 with TU-R-N 212. Two schemes may be applied to mitigate the impact of the non-stationary crosstalk resulting from discontinuous operation.

Vectoring, as described in the ITU-T Recommendation G.993.5, published April 2010, which is incorporated herein as if reproduced by its entirety may be implemented at the access node to cancel crosstalk. Existing vectoring mechanisms deal with the problems of joining of a new line and the orderly leaving of a vectored line. The vectoring mechanisms may be used to effectively mitigate the non-stationary crosstalk resulting from the discontinuous operation. The on and off behaviors at the symbol slots for a subscriber line may have the same impact on other subscriber lines as the joining of a new subscriber line and/or the orderly leaving of a vectored line when the vector CE possesses the knowledge of the on and off behaviors of the symbols.

Node management may also be performed by the control entity. When a subscriber line is going to be turned off for some of the symbols slots during the next TDD frame, the on and off information may be sent to the CE. The CE may forward this information to the other subscriber lines (e.g. victim lines) so that the transceivers do not increase their bit loadings to adapt to the temporarily improved crosstalk condition (e.g. reduction in NEXT) caused by some of the symbols turned off on the subscriber line (e.g. disturbing line). Node management avoids the stability problems on other subscriber lines when the same symbols on the subscriber line are turned on in the a subsequently transmitted TDD frame. For example, in FIG. 2, TU-O-1 204 may turn off some of the symbol slots for a TDD frame transmitted to TU-R-1 212 via subscriber line 114. As crosstalk decreases, the subscriber line 114 that connects TU-O-N 204 to TU-R-N 212 may temporarily measure an improved SNR. When this occurs TU-O-N 204 and/or TU-R-N 212 may transmit more data traffic over the subscriber line 114. However, when the symbol slots are turned back on for a subsequent TDD frame transmitted over the subscriber line 114 that couples TU-O-1 204 and TU-R-1 212, the NEXT may corrupt the data transmitted within the subscriber line 114 that couples TU-O-N 204 to TU-R-N 212.

Figure 6:
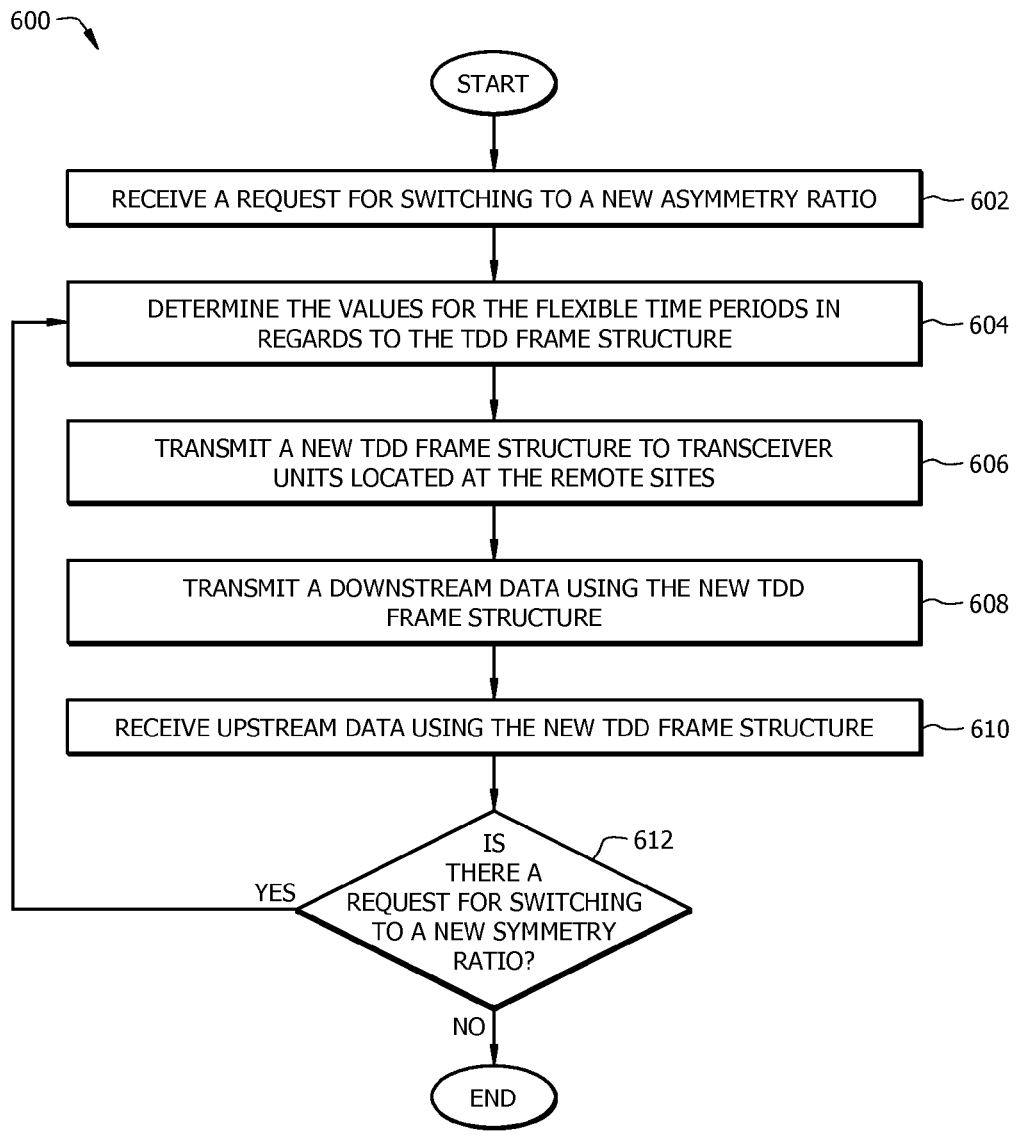
FIG. 6 is a flowchart of an embodiment of a method that dynamically adjusts the nominal asymmetry ratio in the "showtime" state.

FIG. 6 is a flowchart of an embodiment of a method 600 that dynamically adjusts the nominal asymmetry ratio in the "showtime" state. In one embodiment, method 600 may be performed within an access node (e.g. CE). Method 600 may start at block 602 and receive a request from an operator or network administrator for switching to a new nominal asymmetry ratio. After receiving the request, method 600 moves to block 604 and determines the value for the flexible time periods in regards to the TDD frame structure. As discussed above, the flexible time period may include the downstream flexible time period and the upstream flexible time period. Method 600 then proceeds to block 606 and transmits the new TDD frame structure to transceivers units located at the remote sites. Afterwards, method 600 continues to block 608 and transmits downstream data traffic using the new TDD frame structure. In one embodiment, all transceivers within the access node may transmit downstream data using the new TDD frame structure. Once method 600 completes block 608, method 600 may move to block 610 to receive upstream data traffic using the new TDD frame structure. Method 600 may then move to block 612 to determine whether there is a new request for switching to a new nominal asymmetry ratio. If there is a new request, method 600 moves back to block 604. However, if there is no new request, method 600 subsequently ends.

Figure 7:
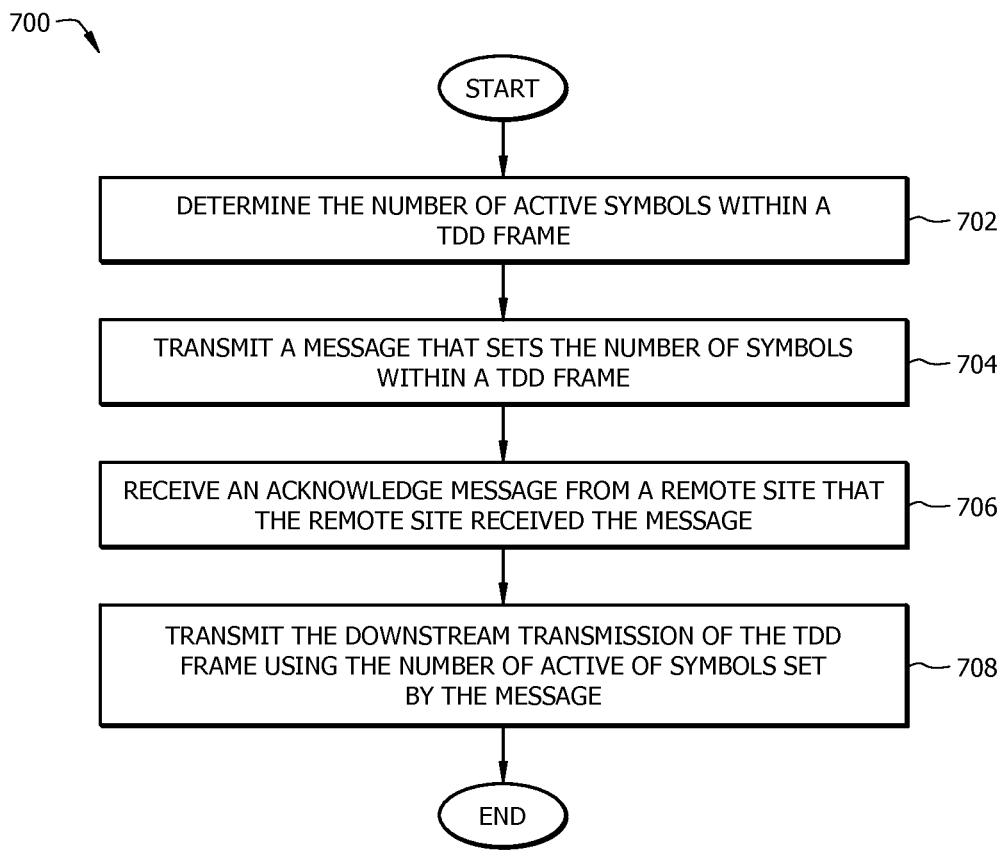
FIG. 7 is a flowchart of an embodiment of a method that dynamically adjusts the number of active symbols in the "showtime" state.

FIG. 7 is a flowchart of an embodiment of a method 700 that dynamically adjusts the number of active symbols in the "showtime" state. Method 700 may receive data traffic that may be less than the allocated capacity for a subscriber line. Method 700 may be performed within an access node (e.g. a transceiver). At block 702, method 700 may determine the number of active symbols within a TDD frame. Method 700 may determine the number of active symbols based on the equation 6. After determining the number of active symbols, method 700 may transmit a message (e.g. online reconfiguration message) at block 704 that sets the number of active symbols within a TDD frame. The message may be transmitted to transceivers located on the remote site. Afterwards, method 700 continues to block 706 and receives an acknowledge message from a remote site that the remote site received the message. The transceiver on the remote site may transmit the acknowledge message. Method 700 may then move to block 708 and transmit the downstream transmission of the TDD frame using the number of active symbols set by the message. Method 700 may subsequently end after completing block 708.

Figure 8:
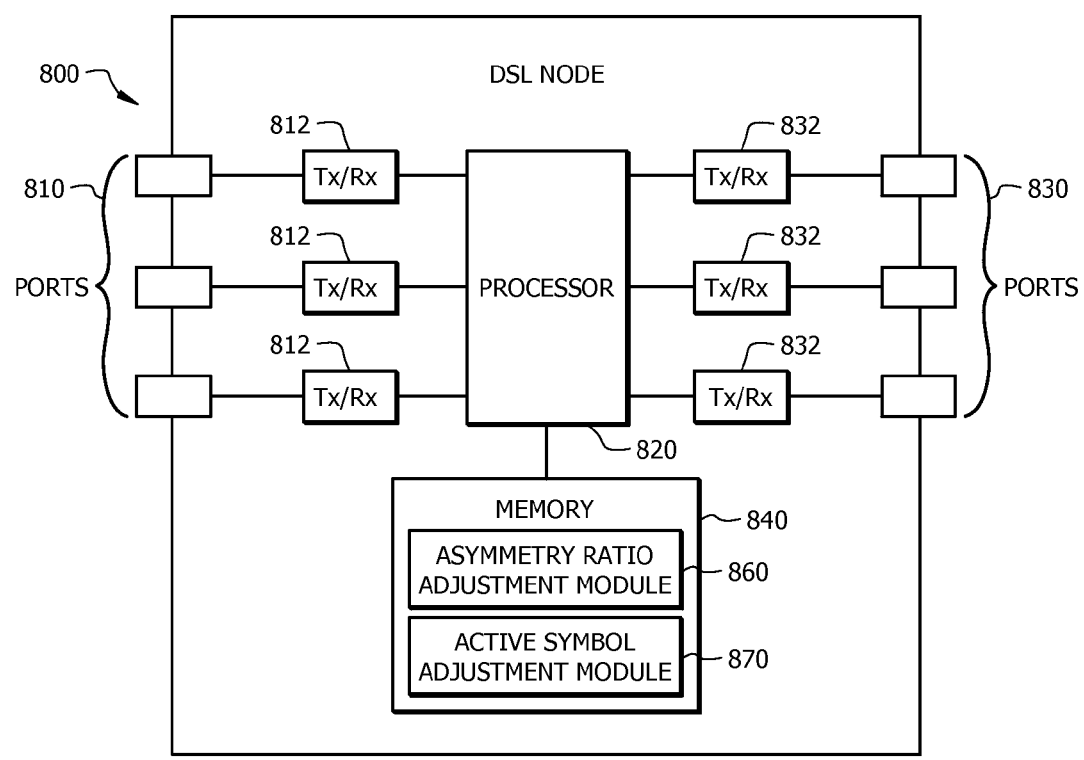
FIG. 8 is a schematic diagram of an embodiment of a DSL node.

FIG. 8 is a schematic diagram of an embodiment of a DSL node 800, such as access node 104 and CPE 106. DSL node 800 may comprise, for example, a transceiver as described above, within a network or system. The DSL node 800 may be located on an operator's end such as a central office, in which case each of a first plurality of ports 810 may be connected or coupled to a subscriber line. Alternatively, the DSL node 800 may be located on a user's end such as a CPE 106, in which case there may be only one port 810 coupled to one subscriber line. A transmitter (Tx)/receiver (Rx) unit 812 may be coupled to each port 810 and configured to transmit data to or receive data from other DSL nodes or network units. A logic unit or processor 820 coupled to the plurality of Tx/Rx units 812 may be configured to process data and determine which DSL node or network unit to send the data to. The processor 820 may be implemented as one or more central processing unit (CPU) chips, cores (e.g., a multi-core processor), field-programmable gate arrays (FPGAs), application specific integrated circuits (ASICs), and/or digital signal processors (DSPs). Although illustrated as a single processor, the processor 820 is not so limited and may comprise multiple processors. The processor 820 may be configured to implement any of the schemes described herein, including method 600 and 700.

A memory 840 may be coupled to the processor 820 and configured to store various types of data. Memory 840 may comprise memory devices including secondary storage, read only memory (ROM), and random access memory (RAM). The secondary storage is typically comprised of one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage. Memory 840 may also comprise an asymmetry ratio adjustment module 860 and an active symbol adjustment module 870. Asymmetry ratio adjustment module 860 may be configured to implement method 600 and dynamically adjust the structure of a TDD frame. Moreover, active symbol adjustment module 870 may be configured to implement method 700 and may be used to operate the DSL node 800 in discontinuous operation.

Since the DSL node 800 may be an intermediary between two network units or sources, it may process and forward data from one source to another. Thus, the DSL node 800 may further comprise a second plurality of ports 830 coupled to a second plurality of Tx/Rx units 832 for transmitting data to or receiving data from other network units. The processor 820 may be configured to implement any of the schemes/methods described herein, such as method 600 and 700.

It is understood that by programming and/or loading executable instructions onto the DSL node 800, at least one of the Tx/Rx 812 or 832, the processor 820, or the memory 840 are changed, transforming the DSL node 800 in part into a particular machine or apparatus having the novel functionality taught by the present disclosure, such as the access node 104. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means+10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. An access node for digital subscriber line (DSL) communication comprising:
a transceiver configured to couple a subscriber line; and
a control entity coupled to the transceiver, wherein the control entity is configured to:
receive a request to switch to a nominal asymmetry ratio between an upstream data rate and a downstream data rate after initialization of the subscriber line;

determine a flexible time period value based on the nominal asymmetry ratio, wherein the flexible time period is used to define a time division duplexing (TDD) frame structure; and forward a message that comprises the flexible time period value to the transceiver, wherein the transceiver is configured to:

transmit a downstream transmission using the TDD frame structure over the subscriber line; and receive an upstream transmission using the TDD frame structure over the subscriber line, wherein the subscriber line comprises a wired connection, wherein the TDD frame structure comprises a fixed downstream time period and a fixed upstream time period, wherein the fixed downstream time period indicates a minimum time period allocated for the downstream transmission, wherein the fixed upstream time period indicates a minimum time period allocated for the upstream transmission, and wherein the fixed downstream time period is used by a receiver at a customer premise equipment (CPE) for signal-to-noise ratio (SNR) measurements, and wherein the upstream time period is used by the receiver at the access node for SNR measurements, and wherein the fixed upstream time period is used by the control entity at the access node for updating a plurality of pre-coder coefficients in the transceiver, and wherein the fixed downstream time period is used by the control entity at the access node for updating a plurality of canceller coefficients in the transceiver.

2. The access node of claim 1, wherein the transceiver is further configured to transmit the message to a remote site located at an opposite end of the subscriber line, and wherein the transceiver is further configured to transmit the message multiple times within a TDD frame.

3. The access node of claim 1, wherein the transceiver is further configured to switch to the nominal asymmetry ratio at a predefined TDD frame.

4. The access node of claim 1, wherein the control entity is further configured to determine the flexible time period value according to the nominal asymmetry ratio, a fixed downstream time period value, and a fixed upstream time period value, wherein the fixed downstream time period value is based on a minimum data rate for the downstream transmission, and wherein the fixed upstream time period value is based on a minimum data rate for the upstream transmission.

5. The access node of claim 4, wherein the flexible time period value, the fixed downstream time period value, and the fixed upstream time period value remain the same until the control entity receives another request to switch to a different nominal asymmetry ratio.

6. The access node of claim 1 further comprising a management information base (MIB), wherein the MIB provides the nominal asymmetry ratio to the control entity.

7. An access node for digital subscriber line (DSL) communication comprising:

a transceiver configured to couple a subscriber line; and a control entity coupled to the transceiver, wherein the control entity is configured to:

receive a request to switch to a nominal asymmetry ratio between an upstream data rate and a downstream data rate after initialization of the subscriber line;

determine a flexible time period value based on the nominal asymmetry ratio, wherein the flexible time period is used to define a time division duplexing (TDD) frame structure; and forward a message that comprises the flexible time period value to the transceiver, wherein the transceiver is configured to:

transmit a downstream transmission using the TDD frame structure over the subscriber line; and receive an upstream transmission using the TDD frame structure over the subscriber line, wherein the subscriber line comprises a wired connection, wherein the TDD frame structure comprises a fixed downstream time period and a fixed upstream time period, wherein the fixed downstream time period indicates a minimum time period allocated for the downstream transmission, wherein the fixed upstream time period indicates a minimum time period allocated for the upstream transmission, and wherein the TDD frame structure comprises a flexible time period, and wherein a length of the flexible time period is set by the flexible time period value.

8. The access node of claim 7, wherein a portion of the flexible time period is allocated for the downstream transmission, and wherein another portion of the flexible time period is allocated for the upstream transmission.

9. The access node of claim 8, wherein allocating the portion of the flexible time period for downstream transmission is determined by the nominal asymmetry ratio.

10. The access node of claim 8, wherein the downstream transmission uses no more than the portion of the flexible time period allocated for the downstream transmission.

11. An access node for digital subscriber line (DSL) communication over a plurality of subscriber lines comprising:

a control entity;

a transceiver coupled to the control entity, wherein the transceiver is configured to:

determine a number of active symbols to be transmitted within a time division duplexing (TDD) frame; and transmit a downstream transmission portion of the TDD frame via a first subscriber line using the number of active symbols to be transmitted, wherein the TDD frame comprises a plurality of symbols, wherein the number of active symbols to be transmitted is no more than a total number of symbols allocated for the downstream transmission portion of the TDD frame, wherein a downstream transmitter of the first subscriber line is powered off after the transmission of the active symbols during the downstream transmission portion of the TDD frame, and wherein the plurality of subscriber lines comprise wired connections, wherein the control entity is configured forward information to a second subscriber line that the downstream transmitter of the first subscriber line will power off after the transmission of the active symbols during the downstream transmission portion of the TDD frame, wherein the control entity is further configured to receive information from the second subscriber line that a transmitter of the second subscriber line will power off, and wherein the transceiver does not increase the number of active symbols transmitted during the downstream portion of the TDD frame when the transmitter of the second subscriber line powers off.

12. The access node of claim 11, wherein the number of active symbols to be transmitted in a TDD frame are set during a showtime state of the first subscriber line, wherein the showtime state references a time period after initializing the first subscriber line, and wherein a vectoring mechanism is used to cancel crosstalk between the first subscriber line and a second subscriber line.

13. The access node of claim 11, wherein each of the symbols comprise a plurality of bits, and wherein the number of active symbols to be transmitted within the TDD frame is determined according to a traffic volume of the subscriber line, a total length of the TDD frame, a number of bits per symbol, and a number of symbols transmitted per second.

14. A method for digital subscriber line (DSL) communication at an access node, comprising:
- coupling, with a transceiver, a subscriber line;
- receiving, by a control entity coupled to the transceiver, a request to switch to a nominal asymmetry ratio between an upstream data rate and a downstream data rate after initialization of the subscriber line;
- determining, by the control entity, a flexible time period value based on the nominal asymmetry ratio, wherein the flexible time period is used to define a time division duplexing (TDD) frame structure;
- forwarding, by the control entity, a message comprising the flexible time period value to the transceiver;
- transmitting, by the transceiver, a downstream transmission using the TDD frame structure over the subscriber line; and
- receiving, by the transceiver, an upstream transmission using the TDD frame structure over the subscriber line, wherein the subscriber line comprises a wired connection, wherein the TDD frame structure comprises a fixed downstream time period and a fixed upstream time period, wherein the fixed downstream time period indicates a minimum time period allocated for the downstream transmission, wherein the fixed upstream time period indicates a minimum time period allocated for the upstream transmission, and wherein the TDD frame structure comprises a flexible time period, and wherein a length of the flexible time period is set by the flexible time period value.

\* \* \* \* \*